US008322044B2

(12) United States Patent
Gregory et al.

(10) Patent No.: US 8,322,044 B2
(45) Date of Patent: Dec. 4, 2012

(54) METHOD OF MEASURING DENTS AND METHOD OF CLASSIFYING DENTS

(75) Inventors: Cortney L. Gregory, Midland, MI (US); Frederick Wheeler, Jr., Saginaw, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 12/865,913

(22) PCT Filed: Jan. 21, 2009

(86) PCT No.: PCT/US2009/000340
§ 371 (c)(1),
(2), (4) Date: Dec. 7, 2010

(87) PCT Pub. No.: WO2009/099516
PCT Pub. Date: Aug. 13, 2009

(65) Prior Publication Data
US 2011/0094119 A1    Apr. 28, 2011

Related U.S. Application Data

(60) Provisional application No. 61/026,002, filed on Feb. 4, 2008.

(51) Int. Cl.
*G01B 3/28* (2006.01)
(52) U.S. Cl. ........................................................ 33/836
(58) Field of Classification Search .................... 33/542, 33/836
See application file for complete search history.

(56) References Cited

U.S. PATENT DOCUMENTS

| 4,033,043 A * | 7/1977 | Cunningham ................. 33/806 |
| 4,507,872 A | 4/1985 | Schermann |
| 4,894,920 A | 1/1990 | Butler et al. |
| 5,758,433 A * | 6/1998 | Alberts .......................... 33/836 |
| 6,389,913 B1 | 5/2002 | Uegaki |

(Continued)

FOREIGN PATENT DOCUMENTS

CN    2240710 Y    11/1996
(Continued)

OTHER PUBLICATIONS

PCT International Search Report for PCT/US2009/000340, dated Sep. 1, 2009, 4 pages.
(Continued)

*Primary Examiner* — G. Bradley Bennett
(74) *Attorney, Agent, or Firm* — Howard & Howard Attorneys PLLC

(57) ABSTRACT

A method of classifying a dent on a surface of a shipping container as being in an acceptable or unacceptable classification includes calculating at least one of an acceptable dent depth range corresponding to the acceptable classification and an unacceptable dent depth range corresponding to the unacceptable classification. The method further includes measuring a depth of the dent with a measurement apparatus and comparing the depth with the acceptable and/or unacceptable dent depth ranges to classify the dent in the acceptable or unacceptable classification. The method of classifying the dent on the surface of the shipping container is accurate and repeatable because it includes measuring the depth of the dent and comparing the depth with the acceptable and unacceptable dent depth ranges. The ability to classify dents allows recipients of the shipping containers to consistently accept or reject shipping containers having dents in the acceptable and unacceptable classifications, respectively.

27 Claims, 7 Drawing Sheets

U.S. PATENT DOCUMENTS

2007/0022620 A1* 2/2007 Batora .................. 33/836
2009/0320310 A1* 12/2009 Pelotte .................. 33/836
2010/0154238 A1* 6/2010 Harshbarger et al. ........... 33/836

FOREIGN PATENT DOCUMENTS

EP 0998995 A2 5/2000

OTHER PUBLICATIONS

Article: IICL, "Section 2—Guide for Container Damage Measurement", 2006, Institute of International Container Lessors, Ltd. pages 15 pages.

English language abstract for CN 2240710 extracted from the espacenet.com database on Jul. 2, 2012, 8 pages.

EMP Cargo Surveyors & Logistics: "EMP Cargo surveyors has been in existence since 2003 providing the Marine Industry the following services", Retrieved from the Internet on Jul. 18, 2012, URL: http://www.empcargosurveyors.com/cargo-surveyor-services.htm, 1 page.

IICL—Institute of International Container Lessors, LTD: "Guide for Container Damage Measurement", Jan. 1, 2006, Washington D.C., USA, pp. 1-65.

Anonymous: "Damage Photo Gallery", Jan. 1, 2006, Retrieved from the Internet, URL:http://www.kline.be/attachment.asp?id=151, 29 pages.

European Search Report for Application No. EP 10190138 completed on Mar. 8, 2011, 2 pages.

* cited by examiner

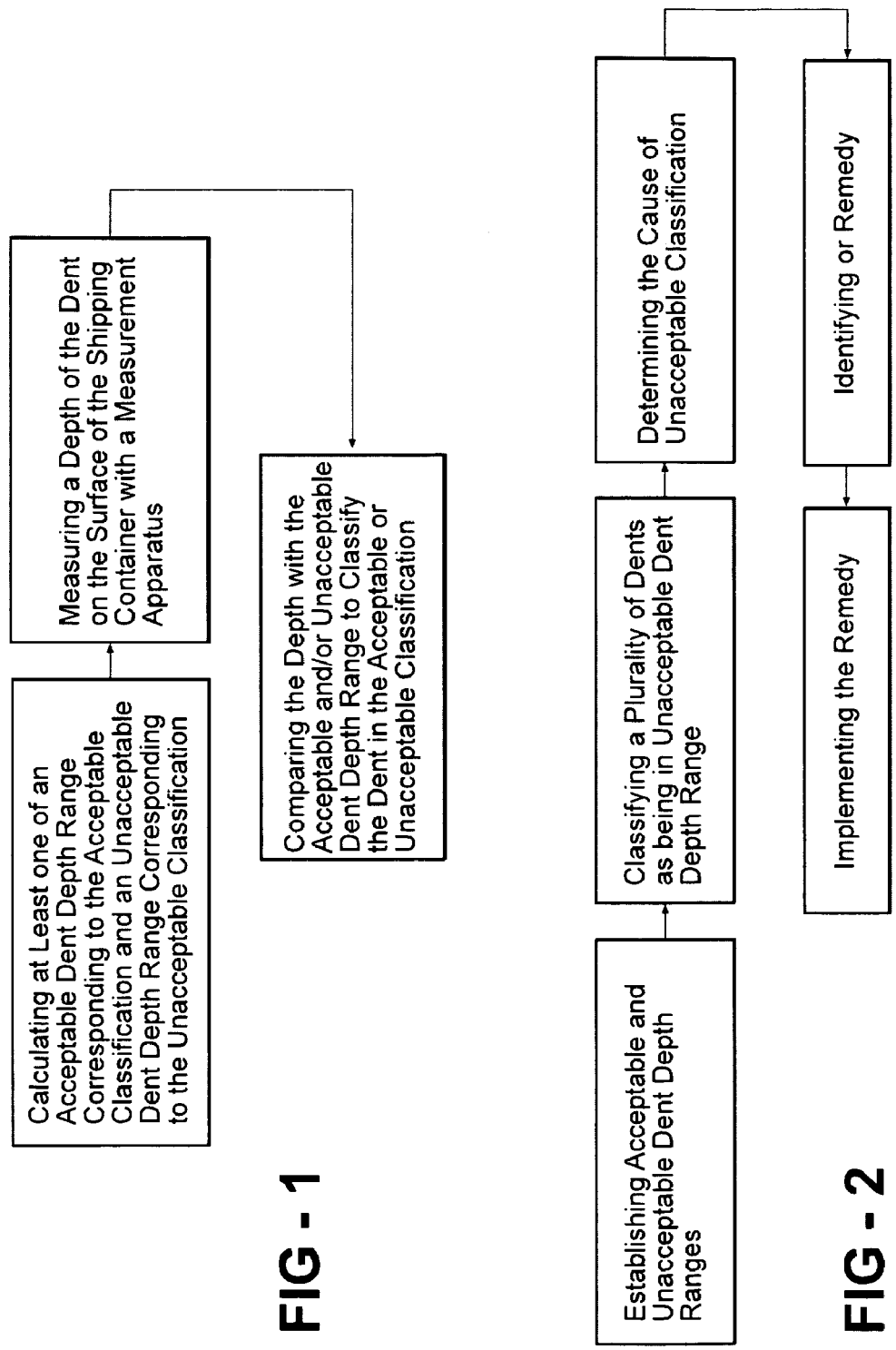

METHOD OF MEASURING DENTS AND METHOD OF CLASSIFYING DENTS

RELATED APPLICATIONS

This application claims priority to and all the advantages of International Patent Application No. PCT/US2008/000340, filed on Jan. 21, 2009, which claims priority to U.S. Provisional Patent Application No. 61/026,002, filed on Feb. 4, 2008.

BACKGROUND OF THE INVENTION

1. Field of the Invention

The present invention generally relates to a method of classifying a dent on a surface of a shipping container as being in an acceptable or unacceptable classification and also to a method of preventing formation of the dents. The present invention further relates to a method of measuring a depth of the dent and a measurement apparatus for measuring the depth of the dent.

2. Description of the Related Art

In industry, goods, such as chemicals, are shipped in shipping containers. Recipients of the shipping containers are increasingly concerned about the number and size of dents in such shipping containers. In particular, relatively large dents damage the shipping container which can lead to contamination of the contents of the shipping container. The relatively large dents create cracks in the shipping container and the contents of the shipping container typically react with the material of the shipping container about the cracks such that the contents become contaminated. Shipping containers can include a lining and relatively large dents crack the lining which results in contamination of the contents. Further, some shipping containers include a plunger inside the shipping container used to remove the contents from the shipping container. Dents of a sufficient depth prevent the plunger from operating properly. Currently, no adequate method exists for identifying contaminated contents without opening the shipping container to examine the inside of the shipping container.

Recipients of the shipping containers inspect the shipping containers for dents and reject shipping containers having relatively large dents. Current inspection of the shipping containers is subjective. In other words, the inspection does not involve quantifying the depth of dents for an objective inspection. Typically, the recipient has a photograph depicting a dent of an unacceptable classification, i.e., a dent that is relatively large such that the contents are contaminated. The recipient visually compares the dent on the shipping container with the photograph and the shipping container is rejected if the dent on the shipping container visually appears to be deeper than the dent depicted in the photograph. This subjective analysis is not consistent, i.e., is not accurate and repeatable, and leads to shipping containers being rejected even though the dent is not in the unacceptable classification. Alternatively, recipients of the shipping container open the shipping container to inspect the contents of the shipping container for contamination. Such an inspection is time consuming and often the contents of the shipping containers degrade upon the opening of the shipping containers.

In addition, shippers of the shipping containers seek to identify the source of the dents so that the source may be eliminated. However, an objective method of identifying and eliminating the sources of dents has not been identified in the prior art. Without an objective method, much time and effort is consumed investigating the source of the dents and often resources for such time and effort is not available.

Measurement apparatuses are generally known for quantifying contours of a surface. Such measurement apparatuses generally include a frame, a mounting device fixed to the frame for mounting the measurement apparatus to the surface, and a measuring device fixed to the frame for measuring the contour of the surface. However, the surface of the shipping container defines features, e.g., ribs, and the surface of the shipping container may have several dents. The measurement apparatuses of the prior art are not conducive to measuring dents on the surface of shipping containers because the measurement apparatus is not easily mounted to such surfaces. Specifically, the measuring device must be aligned with the dent such that the mounting device is positioned flush against the surface in order to achieve an accurate measurement. However, the features and the several dents in the surface often prevent the mounting device from being positioned flush against the surface.

Accordingly, it would be desirable to establish methods of measuring, classifying, and preventing dents on the surface of the shipping container. It would also be desirable to manufacture a measurement apparatus that is conducive to measuring the depth of the dent in the surface of the shipping container.

SUMMARY OF THE INVENTION AND ADVANTAGES

The present invention includes a method of classifying a dent on a surface of a shipping container as being in an acceptable or unacceptable classification. The method comprises calculating at least one of an acceptable dent depth range corresponding to the acceptable classification and an unacceptable dent depth range corresponding to the unacceptable classification. The method further comprises measuring a depth of the dent on the surface of the container with a measurement apparatus and comparing the depth with at least one of the acceptable and unacceptable dent depth ranges to classify the dent in the acceptable or unacceptable classification.

The present invention further includes a method of measuring the depth of the dent on the surface of the shipping container with the use of a measurement apparatus. The method comprises positioning to the measurement apparatus on the surface of the shipping container, aligning the measurement apparatus with the dent on the surface of the shipping container, and determining a measurement corresponding to the depth of the dent on the surface of the shipping container.

The present invention further includes a method of preventing formation of dents of the unacceptable classification on the surface of the shipping container. The method comprises calculating the acceptable dent depth range corresponding to the acceptable classification and the unacceptable dent depth range corresponding to the unacceptable classification. The method further comprises classifying a plurality of dents on the surface of the shipping container as being in the unacceptable dent depth range with a measurement apparatus and determining the cause of the dent classified in the unacceptable classification. The method further comprises identifying at least one remedy that eliminates the cause of the dent classified in the unacceptable classification and implementing the at least one remedy to prevent the formation of the dent classified in the unacceptable classification.

The method of classifying the dent on the surface of the shipping container is accurate and repeatable because it includes measuring the depth of the dent and comparing the depth with the acceptable and unacceptable dent depth ranges. The ability to consistently classify dents allows for consistent acceptance and rejection of shipping containers having dents in the acceptable and unacceptable classifications, respectively. In addition, the method of preventing formation of dents of the unacceptable classification on the surface of the shipping container reduces cost and increases efficiency related to transporting shipping containers. Specifically the method of preventing formation of dents is used by shippers and recipients of the shipping containers to improve the handling of the shipping containers thereby preventing dents of the unacceptable classification.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a block diagram showing selected steps of a method of classifying the dent on the surface of a shipping container as being in an acceptable or unacceptable classification;

FIG. 2 is a block diagram showing selected steps of a method of preventing formation of dents of the unacceptable classification on the surface of the shipping container;

DETAILED DESCRIPTION OF THE INVENTION

Figure 3:
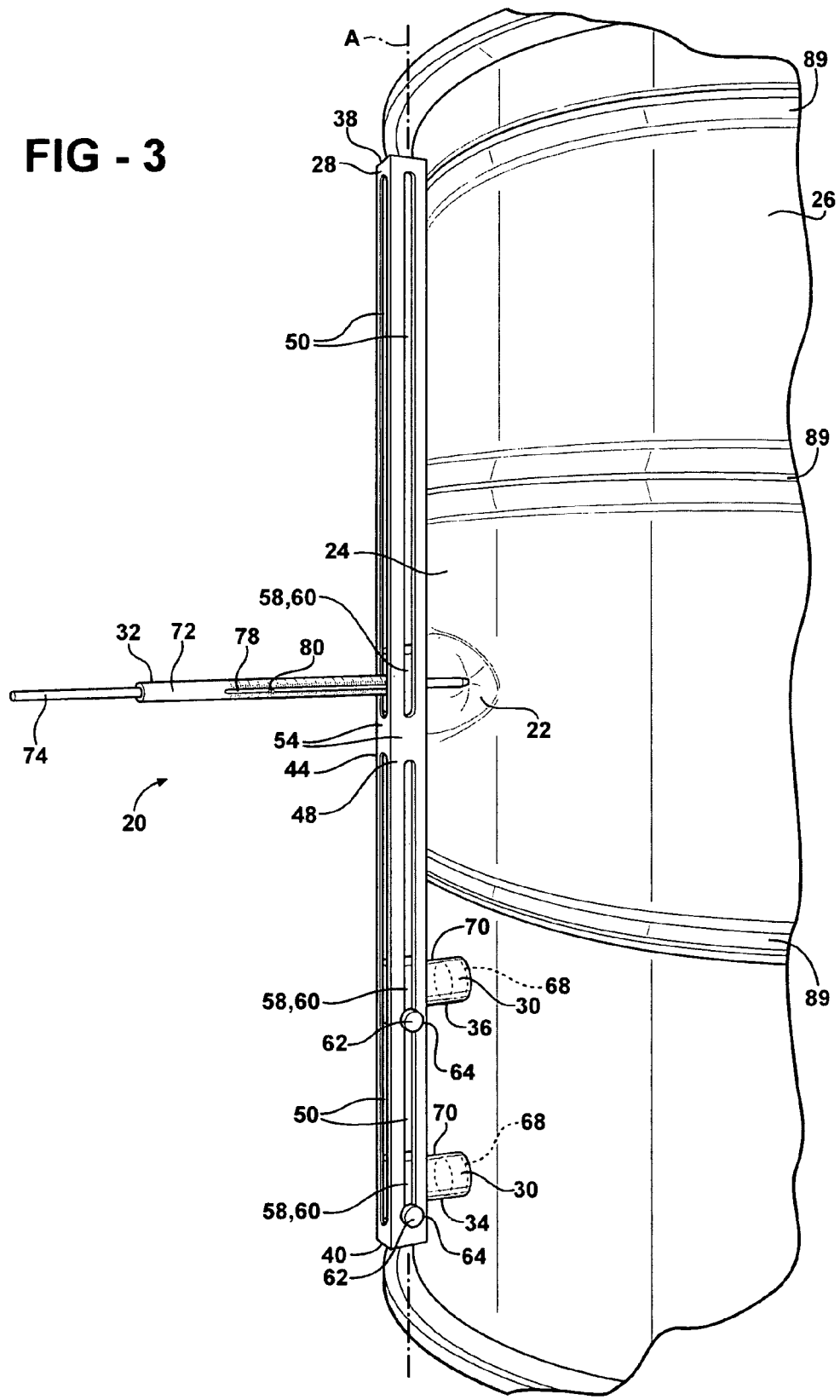
FIG. 3 is a perspective view of a measurement apparatus for measuring a depth of a dent with the measurement apparatus mounted on a surface of a shipping container.

Referring to the Figures, wherein like numerals indicate corresponding parts throughout the several views, the present invention includes a method of classifying a dent 22 on a surface 24 of a shipping container 26 as being in an acceptable or unacceptable classification. Selected steps of such a method are shown in FIG. 1. The method uses objective data and measurements such that the classification is consistent, i.e., accurate and repeatable. The method of classifying the dent 22 can be used to eliminate the necessity of opening the shipping container 26 to determine whether contents of the shipping container 26 are contaminated. The shipping container 26 is, for example, formed of metal and more specifically steel for transporting and storing chemicals. Alternatively, the shipping container 26 is formed of plastic. For example, the shipping container 26 may be any size such as, for example, the standard 20 liter shipping container or 200 liter shipping container. It should be appreciated that the shipping container 26 may be any type of container and can be formed of any material without departing from the nature of the present invention. The present invention also includes a method of preventing the formation of dents 22 on the surface 24 of the shipping container 26. Selected steps of such a method are shown in FIG. 2. The present invention also includes a method of measuring a depth of the dent 22 on the surface 24 of the shipping container 26 with the use of a measurement apparatus 20. It should be appreciated that the method of measuring the depth of the dent 22 can be performed with any type of measurement apparatus without departing from the nature of the present invention and, as will be discussed in greater detail below, the present invention also includes an example of the measurement apparatus 20 that can be used to perform the method of measuring the depth of the dent 22. The measurement apparatus 20 provides for an objective measurement of the depth of the dent 22, i.e., the measurement apparatus 20 allows for the depth of the dent 22 to be quantified. Because the depth of the dent is quantified, these depths can be effectively compared with one another and more accurately classified as being in the acceptable or unacceptable classification, i.e., the objective measurement removes human error that is present with subjective measurements.

The method of classifying the dent 22 on the surface 24 of the shipping container 26 is used, for example, to establish an objective system to accept or reject shipping containers 26 without the necessity of opening the shipping containers 26 to examine an interior of the shipping container 26 or to examine whether the contents of the shipping container 26 have been contaminated. Dents 22 that are classified in the unacceptable classification are, for example, dents 22 of sufficient size to cause contamination of the contents of the shipping container 26. Contamination can be caused by fractures in the shipping container 26 or in a lining, i.e., coating, of the shipping container 26 caused by the dent 22 such that the shipping container 26 and/or the lining changes the composition of the contents of the shipping container 26. For example, in a scenario where the contents are liquid chemicals, the liquid chemicals typically react with the material of the shipping container 26 through cracks in the shipping container 26 and/or the lining such that the liquid chemicals become contaminated. Another example of dents 22 that are classified in the unacceptable classification are dents 22 that prevent a plunger in the shipping container 26 from properly functioning. The acceptable and unacceptable classification is typically based upon the depth of the dent 22 at the deepest depth.

The method of classifying the dent 22 includes establishing an acceptable and unacceptable dent depth range, measuring the depth of the dent 22 on the surface 24 of the shipping container 26, and comparing the depth with the acceptable and unacceptable dent depth ranges. Specifically, the acceptable dent depth range corresponds to the acceptable classification and the unacceptable dent depth range corresponds to the unacceptable classification. As such, comparing the depth with the acceptable and unacceptable dent depth range enables one to classify the dent 22 in the acceptable or unacceptable classification. In other words, the depth is measured with, for example, the measurement apparatus 20 and the dent 22 is classified as acceptable if the depth is within the acceptable dent depth range and is classified as unacceptable if the depth is within the unacceptable dent depth range. It should be appreciated that the depth can be measured with any type of measurement apparatus that can be used to measure distance such as the depth.

Establishing the acceptable and unacceptable dent depth range is further defined as calculating at least one of the acceptable and unacceptable dent depth ranges to classify the dent in the acceptable or unacceptable classification. Specifically, the method includes classifying each of the plurality of shipping containers as useable or unuseable containers. As set forth below, the classification of the containers as useable or unuseable can be, for example, based upon contamination of the contents of the containers or the ability of the plunger in the shipping container to properly function. It should be appreciated that the contamination of the contents and the functionality of the plunger are provided for exemplary purposes, and the shipping containers can be classified as useable or unuseable for any reason.

As set forth below with respect to the contamination of the contents and the functionality of the plunger, the method further comprises correlating the depths corresponding to the unacceptable dent depth range and correlating the depths corresponding to the acceptable dent depth range. Specifically, the depths corresponding to the useable container and the depths corresponding to unusable container are correlated.

As one example of establishing an acceptable and unacceptable dent depth range, the depth of dents 22 on a plurality of shipping containers 26 are measured and the contents of each of the plurality of shipping containers 26 is classified as contaminated contents or uncontaminated contents. In other words, the plurality of shipping containers 26 are used to collect data which is used to calculate, the acceptable and unacceptable dent depth ranges. When calculating the dent depth ranges, the shipping containers 26 and/or the contents of the shipping containers 26 are examined for contamination. For example, in the scenario where the shipping container 26 includes a lining, the step of classifying the contents of the shipping container 26 is further defined as examining the lining of each of the shipping containers 26 for damage. Specifically, the lining is examined for cracking or corrosion in the vicinity of the dent 22. In addition, in the scenario where the contents are liquid chemicals, contamination may be detected by testing the composition of the chemicals for contamination.

In the scenario where the contamination of the contents is considered, the step of calculating the acceptable and unacceptable dent depth ranges further includes correlating the depths corresponding to the contaminated contents with the unacceptable dent depth range and correlating the depths corresponding to the uncontaminated contents with the acceptable dent depth range. For example, the largest and smallest depths corresponding to the contaminated contents define the unacceptable dent depth range. Likewise, for example, the largest and smallest depths corresponding to the uncontaminated contents define the acceptable dent depth range.

As another example of calculating the acceptable and unacceptable dent depth range, in the scenario where the shipping container 26 includes the plunger in the shipping container 26 used to remove contents from the shipping container 26, the functionality of the plunger is considered, i.e., whether the plunger is properly or improperly functioning. The plunger of each of the plurality of shipping containers 26 is classified as useable or unusable. The step of classifying the contents of the shipping container 26 is further defined as examining the shipping container 26 and the plunger for interference between the shipping container 26 and the plunger.

In the scenario where the functionality of the contents is considered, the step of establishing the acceptable and unacceptable dent depth ranges further includes correlating the depths corresponding to the unusable plunger with the unacceptable dent depth range and correlating the depths corresponding to the useable plunger with the acceptable dent depth range.

The method may include the step of intentionally forming the dents 22 in the plurality of shipping containers 26. The dents 22 are formed so that the dents 22 have varying depths to selectively predetermine a boundary of the acceptable and unacceptable dent depth ranges. In other words, the dents 22 are formed to collet data with respect to depths and acceptable and unacceptable dent depth ranges. For example, dents 22 having depths of a magnitude ranging in equal increments from a relatively small magnitude to a relatively large magnitude are formed. The dents 22 may be formed intentionally to selectively predetermine the boundary. Alternatively, the data can be collected from a plurality of shipping containers 26 that are accidentally dented during shipping or during other typical uses.

As discussed in greater detail below, the method of classifying the dents 22 may be used by recipients of the shipping containers 26 to accept or reject the shipping containers 26. Specifically, the recipient classifies dents 22 on the received shipping containers 26 as being in the acceptable or unacceptable classification. Accordingly, the recipient may accept shipping containers 26 having dents 22 in the acceptable classification and may reject shipping containers 26 that do not have dents 22 in the unacceptable classification.

As such, after the acceptable and unacceptable dent depth ranges are established, the method further includes instructing the recipient of shipping containers 26 to measure the depth of the dent 22 on the surface 24 of the shipping container 26 to compare the depth with the acceptable and unacceptable dent depth ranges to classify the dent 22 in the acceptable or unacceptable classification. For example, the method includes distributing the acceptable and unacceptable dent depth ranges to the recipient. The recipient can then reject any shipping container 26 having the dent 22 in the unacceptable dent depth range.

The method of preventing formation of dents 22 of the unacceptable classification on the surface 24 of the shipping container 26 includes classifying each of a plurality of dents 22 as being in the unacceptable classification, determining the cause of the dent 22 classified in the unacceptable classification, and implementing a remedy to eliminate the cause of the dent 22 classified in the unacceptable classification.

Optionally, the step of classifying each of the plurality of dents 22 is accomplished with the above described method of classifying the dent 22 as being in an acceptable or unacceptable classification. Specifically, the step of classifying the dent 22 is further defined as establishing the acceptable dent depth range corresponding to the acceptable classification and the unacceptable dent depth range corresponding to the unacceptable classification, measuring the depth of the dent 22 on the shipping container 26, and comparing the depth with the acceptable and unacceptable dent depth ranges. However, it should be appreciated that the classification can be established in any manner without departing from the nature of the present invention.

The step of determining the cause of the dent 22 is further defined as identifying sources of dents 22, forming a plurality of dents 22 with each source, and measuring the depth of the plurality of dents 22. The method further includes correlating the depth with each source of dents 22 to determine a dent depth range for each source of dents 22. For example, determining the cause is further defined as identifying a fork truck as the cause. In other words, forks of the fork truck can dent 22 the shipping container 26 when the fork truck is used to move the shipping container 26. Other sources include, for example, dents 22 resulting from dropping the shipping container 26, movement and subsequent collision of shipping containers 26 during shipping, and using improper equipment to move the shipping container 26.

After the dent depth range is determined for sources of dents 22, the method further includes measuring the depth of the dent 22 of another shipping container 26 and comparing the depth of the dent 22 of the another shipping container 26 to the dent depth range for each source to determine the source of the dent 22. In other words, the depth of the dent 22 of another shipping container 26 is used to identify the potential sources of the dent 22 by eliminating any source that corresponds to the dent depth range that does not include the respective depth.

The method further includes adding precautionary measures to another shipping container 26 sufficient to withstand the force required to form dents 22 to protect another shipping container 26 from dents 22. Specifically, the step of implementing the remedy is further defined as protecting the shipping container 26 with precautionary measures sufficient to prevent the formation of dents 22 of the unacceptable classification. For example, protecting the shipping container 26 with precautionary measures includes providing the surface 24 of the shipping container 26 with impact absorbing material. Examples of impact absorbing materials include those commonly referred to in industry as bubble wrap and honeycomb protective wrap. Alternatively, protecting the shipping container 26 includes selecting a wall thickness of the shipping container 26 sufficient to withstand denting. The step of implementing the remedy can also include establishing a thickness of the lining sufficient to prevent contamination of the contents of the plurality of shipping containers.

Alternatively, in the scenario where the cause of the dent 22 is the fork truck, the step of protecting the shipping container 26 is further defined as providing padding on the fork truck. Specifically, for example, the padding is positioned on the forks of the fork truck to absorb impact of the forks on the shipping container 26.

The step of implementing the remedy is further defined as examining the plurality of shipping containers 26 to determine an area of the plurality of shipping containers 26 that most frequently exhibit dents 22 of the unacceptable classification and protecting the area with precautionary measures. For example, as described above, protecting the area with precautionary measures is further defined as providing the area of the shipping container 26 with impact absorbing material. Focusing on the area most frequently exhibiting dents 22 reduces the cost of precautionary measures. For example, in the scenario where the precautionary measure is impact absorbing material, less impact absorbing material is required because the impact absorbing material is only placed on the area most frequently exhibiting dents 22.

The step of implementing the remedy is further defined as measuring the depth of the dents 22 of the unacceptable classification on the plurality of shipping containers 26 to determine the depth that is most frequently exhibited and determining the force required to form dents 22 having the depth that is most frequently exhibited. As such, a sufficient amount of precautionary measures may be taken to absorb the force required to form the dents 22 most frequently exhibited. In other words, the method further includes predicting the amount of energy required to form dents 22 of the unacceptable classification. As such, the shipping container 26 may be protected with sufficient precautionary measures to absorb such an amount of energy. For example, the amount of energy required to form the dent 22 of the unacceptable classification may be determined by testing a plurality of shipping containers 26 in a controlled environment. Further, the wall thickness of the shipping container 26 and/or the thickness of the lining can be optimized to resist the amount of energy required to form the dent 22 of the unacceptable classification.

As set forth above, an example of embodiments of the measurement apparatus 20 used to perform the methods set forth above is shown in FIGS. 3-8. However, it should again be appreciated that the measurement apparatus 20 is but one example of the measurement apparatuses used in the methods set forth above and the methods set forth above can be performed with a wide variety of measurement apparatuses. The measurement apparatus 20 includes a frame 28 defining an axis A and a mounting device 30 coupled to the frame 28 for mounting the frame 28 to the surface 24. Specifically, the measurement apparatus 20 includes a first mounting device 34 and a second mounting device 36 spaced from each other. It should be appreciated that the measurement apparatus 20 may include more or less than two mounting devices 30 without departing from the nature of the present invention. As will be discussed below, the mounting device 30 is typically further defined as one or more magnets. The measurement apparatus 20 includes a measuring device 32 coupled to the frame 28 spaced from the mounting device 30 for measuring the depth of the dent 22 on the surface 24. As will be discussed below, the measuring device 32 is typically spring-loaded.

The frame 28 can be elongated and can extend longitudinally along the axis A. Specifically, the frame 28 includes a first end 38 and a second end 40 spaced from the first end 38. The axis A extends longitudinally between the first and second ends 38, 40. The frame 28 is typically rectangular in cross-section. However, it should be appreciated that the frame 28 may have any shape cross-section without departing from the nature of the present invention. The frame 28 may include a front surface 42, a back surface 44 spaced opposite the front surface 42, a left surface 46 extending between the front and back surfaces 42, 44, and a right surface 48 spaced opposite the left surface 46 and also extending between the front and back surfaces 42, 44. The frame 28 may be formed of a rigid material, for example aluminum. However, it should be appreciated that the frame 28 may be formed of any type of suitable rigid material without departing from the nature of the present invention.

The frame 28 defines a slot 50 extending along the axis A and specifically defines a pair of slots 50 spaced from each other along the axis A. The frame 28 typically defines a bore 52 extending longitudinally through the frame 28, i.e., the bore 52 is open at each of the first and second ends 38, 40, and the slots 50 extend inwardly to the bore 52. Typically, the bore 52 is rectangular in cross-section. Each of the front, back, and right surfaces 42, 44, 48 of the frame 28 define the pair of slots 50 spaced longitudinally along the frame 28. Typically, the left surface 46 of the frame 28 need not define the pair of slots 50. A wall 54 is disposed between each pair of slots 50 with the bore 52 extending within the frame 28 behind the wall 54. It should be appreciated that the left surface 46 may define the pair of slots 50 in addition to or in the alternative to the pair of slots 50 in the right surface 48 without departing from the nature of the present invention.

Figure 4:
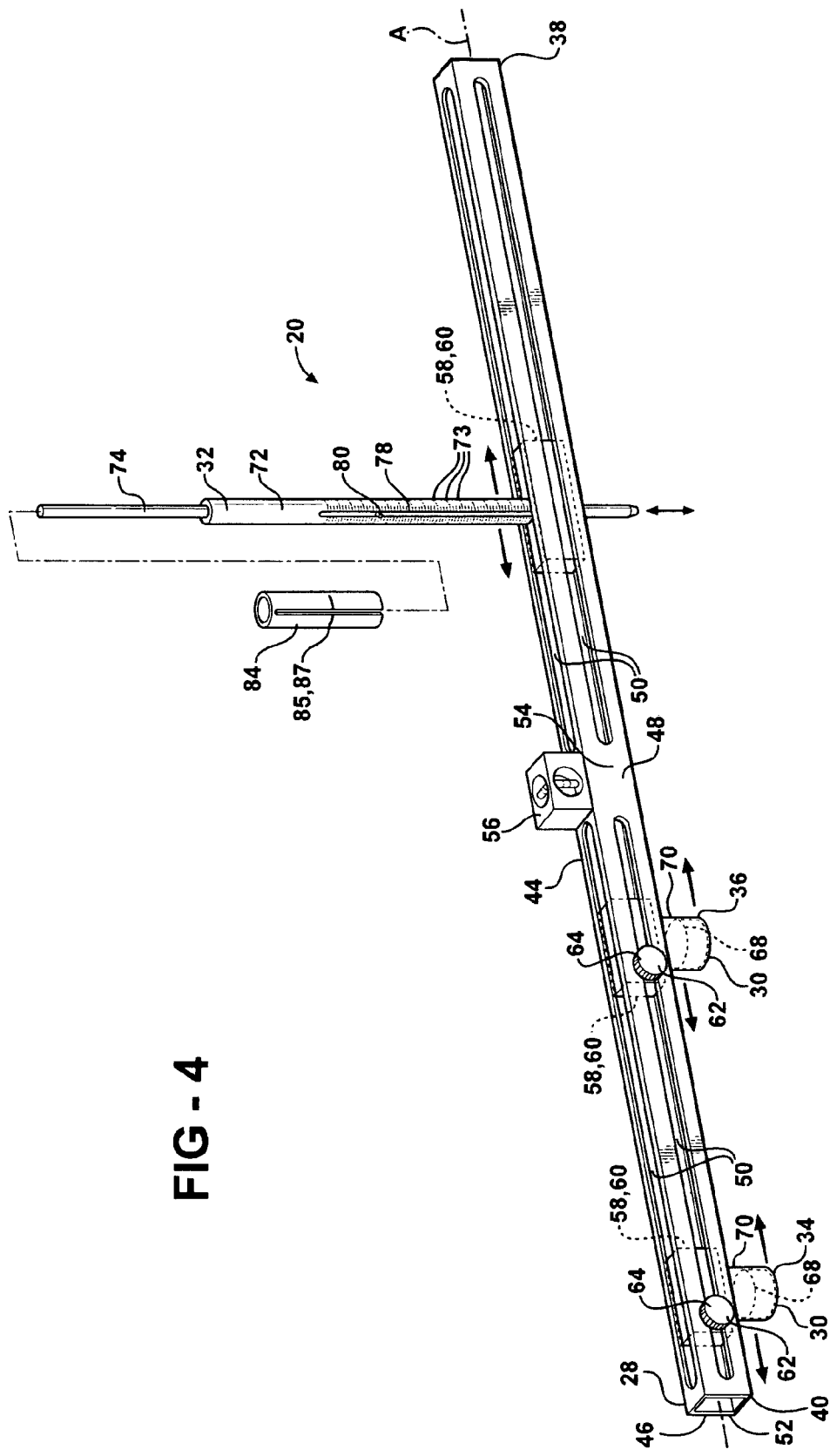
FIG. 4 is a perspective view of the measurement apparatus.

As shown in FIG. 4, the apparatus includes a level gauge 56 mounted to the frame 28. Although not required, the level gauge 56 is used to level the frame 28 relative to the surface 24. Specifically, the frame 28 is preferably positioned on the surface 24 such that the axis A of the frame 28 extends in parallel with the surface 24 and the level gauge 56 is used to achieve such a position. In the configuration shown in FIG. 4, the level gauge 56 is a spirit level; however, it should be appreciated that the level gauge 56 may be of any type without departing from the nature of the present invention.

At least one of the mounting device 30 and the measuring device 32 are selectively moveable along the axis A of the frame 28 relative to the other of the mounting device 30 and the measuring device 32 for aligning the measuring device 32 with the dent 22. That is, either the mounting device 30, or the measuring device 32, or both the mounting and measuring devices 30, 32 are selectively movable along the axis A. Specifically, at least one of the mounting device 30 and the measuring device 32 are moveable along the axis A between the first and second ends 38, 40. In an embodiment shown in FIGS. 3-6, the first and second mounting devices 34, 36 and the measuring device 32 are each moveable along the frame 28 relative to each other. Alternatively, in another embodiment shown in FIG. 7, the measuring device 32 is fixed in position relative to the frame 28 and the mounting device 30 is moveable between the first and second ends 38, 40 of the frame 28. i.e., the first and second mounting devices 34, 36 are each moveable between the first and second ends 38, 40 of the frame 28.

The measurement apparatus 20 includes an adjustment device 58 coupled, e.g., slideably engaged, to the frame 28 between the frame 28 and at least one of the mounting device 30 and the measuring device 32. In the embodiment shown in FIGS. 3-6, the first and second mounting devices 34, 36 and the measuring device 32 are each coupled to one of the plurality of blocks 60, respectively. In the embodiment shown in FIG. 7, the first and second mounting devices 34, 36 are coupled to one of the plurality of blocks 60, respectively. The block 60 is slideably engaged with the slot 50 and, specifically, the plurality of blocks 60 are slideably engaged with the slot 50. In the embodiment shown in FIGS. 3-6, both the mounting device 30, i.e., the first and second mounting devices 34, 36, and the measuring device 32 are coupled to at least one of the blocks 60, respectively. In the embodiment shown in FIG. 7, the first and second mounting devices 34, 36 are coupled to one of the blocks 60 respectively.

The plurality of blocks 60 are configured to slideably engage the bore 52 of the frame 28. In other words, the blocks 60 are sized and shaped such that the blocks 60 freely slide in the bore 52 of the frame 28. As shown in FIGS. 3-7, the blocks 60 are rectangular in cross-section to slide within the rectangular bore 52. However, it should be appreciated that the blocks 60 may be any shape such that the blocks 60 slide in the bore 52 without departing from the nature of the present invention. The blocks 60 are typically formed of a material that easily slides in the bore 52 of the frame 28 such as, for example, polyethylene.

The adjustment device 58 may include a block fastener 62 coupled to the block 60. The block fastener 62 is engagable with the block 60 and the frame 28 for selectively locking the adjustment device 58 in position relative to the frame 28. For example, the block fastener 62 is a threaded fastener including a head 64 and a threaded shaft 66 extending from the head 64. The block fastener 62, the block 60, and the frame 28 may be arranged in any manner such that the threaded fastener selectively locks the block 60 in position relative to the frame 28. For example, the threaded shaft 66 threadedly engages the block 60 and the head 64 engages the frame 28 to lock the block 60 in position relative to the frame 28. Specifically, in such a configuration, the block fastener 62 is moveable between an engaged position with the head 64 engaged with the frame 28 for locking the block 60 to the frame 28 and a disengaged position with the head 64 disengaged from the frame 28 for unlocking the block 60 from the frame 28. It should be appreciated that the block fastener 62 is not limited to a threaded fastener and may be any sort of fastener conducive to locking the block 60 in position relative to the frame 28 without departing from the nature of the present invention.

The mounting device 30 extends from the frame 28 for mounting the measurement apparatus 20 to the frame 28. Specifically, the measurement apparatus 20 is positioned with the mounting device 30 extending from the frame 28 toward the surface 24 and the mounting device 30 engages the surface 24 to fix the measurement apparatus 20 in position relative to the surface 24.

The mounting device 30 optionally includes a magnet 68 mounted to the block 60. In a scenario where the surface 24 is metal, the magnet 68 magnetically attaches to the surface 24 to fix the measurement apparatus 20 in position relative to the surface 24. It should be appreciated that the mounting device 30 is not limited to magnetic attachment to the surface 24 and may be attached to the surface 24 in any fashion without departing from the nature of the present invention. For example, the mounting device 30 may be attached to the surface 24 by mechanical interaction, e.g., a clamp, adhesives, or suction. It should also be appreciated that the measurement apparatus 20 may be maintained in position along the surface 24 by having a user hold the measurement apparatus in position. In such a scenario, the mounting devices may aid in positioning the measurement apparatus 20 on the surface.

The mounting device 30 typically includes a housing 70 extending about a portion of the magnet 68. The housing 70 is typically formed of any suitable rigid material, for example polyethylene, and is attached to the block 60. It should be appreciated that the housing 70 may be formed integrally with the block 60 or may be formed separately and subsequently attached to the block 60. For example, the housing 70 is attached to the block 60 with adhesive or by mechanical interaction such as a screw.

In the configuration shown in FIGS. 3-7, the measuring device 32 extends from the frame 28 transversely to the axis A for measuring the depth of the dent 22 relative to the frame 28. The measuring device 32 includes a sleeve 72 coupled to the frame 28 and a rod 74 slideably extending from the sleeve 72 transversely to the frame 28 for contacting the surface 24 to measure the depth of the dent 22. Specifically, the adjustment device 58 defines a through hole 76 having a center axis C extending through the slot 50 with the sleeve 72 extending into the slot 50 and the through hole 76. Typically, the sleeve 72 is press-fit into the through hole 76. The rod 74 is typically formed of any suitable rigid material, for example metal, such as stainless steel, or plastic. The rod 74 presents a tip for contacting the surface 24 of the shipping container 26 and the tip is typically tapered and coated with a polymeric material to prevent damage to the surface 24 of the shipping container 26. It should be appreciated that the embodiments of the measuring device 32 depicted in FIGS. 3-8 is exemplary and that the measuring device can measure the depth of the dent 22 in any fashion without departing from the nature of the present invention. For example, the measuring device can measure the depth of the dent 22 with laser, sound waves, or air flow, etc.

Figure 5:
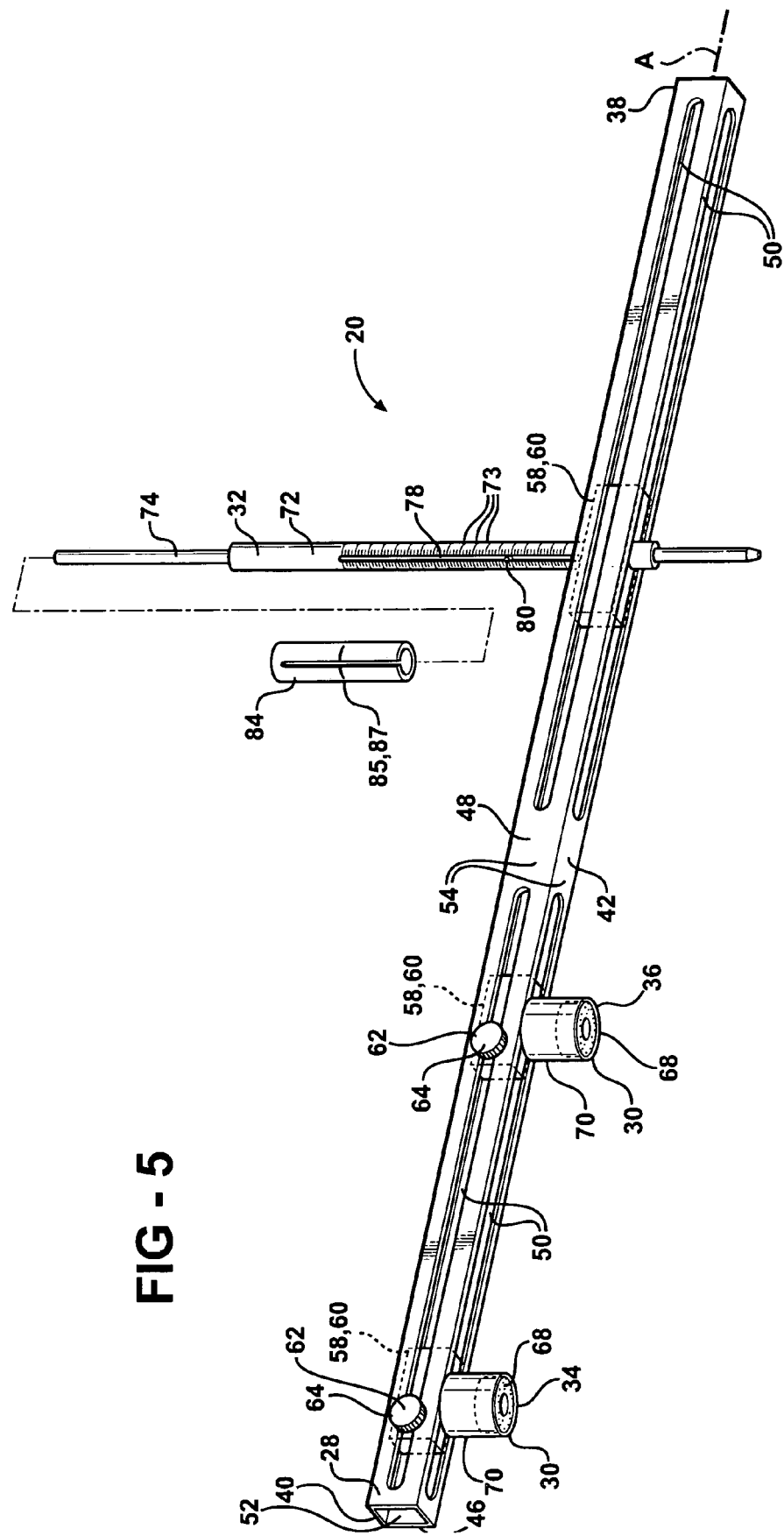
FIG. 5 is another perspective view of the measurement apparatus.

As best shown in FIGS. 4-5, the sleeve 72 of the measuring device 32 extends through one of the pair of slots 50 defined by the back surface 44. The sleeve 72 and/or the rod 74 of the measuring device 32 extends through one of the slots 50 defined by the front surface 42 of the frame 28, and the housing 70 of each of the pairs of mounting devices 30 extend though one of the slots 50 defined by the front surface 42.

When the measurement apparatus 20 is mounted to the surface 24, the rod 74 slideably extends from the sleeve 72 for contacting the surface 24 to measure the depth of the dent 22. Specifically, the rod 74 measures the depth of the dent 22 relative to the frame 28. For example, the sleeve 72 is a reference of measurement. As shown in FIGS. 3-7, the sleeve 72 presents measuring indicia 73 and the position of the rod 74 relative to the sleeve 72 is quantified by viewing the position of the rod 74 relative to the measuring indicia 73. Specifically, the sleeve 72 of the measuring device 32 presents the measuring indicia 73 as tick marks.

Specifically, the sleeve 72 defines a slit 78 and the rod 74 includes an indicator 80 extending laterally from the rod 74 in the slit 78 for measuring a relative position of the rod 74 relative to the sleeve 72. In other words, the indicator 80 is visible in the slit 78 and the position of the rod 74 is quantified by reference to the measuring indicia 73, i.e., the indicator 80 objectively quantifies a position of the rod 74 relative to the sleeve 72. Typically, the rod 74 defines a hole 82 and the indicator 80 is engaged with the hole 82 and fixed relative to the rod 74.

Figure 6:
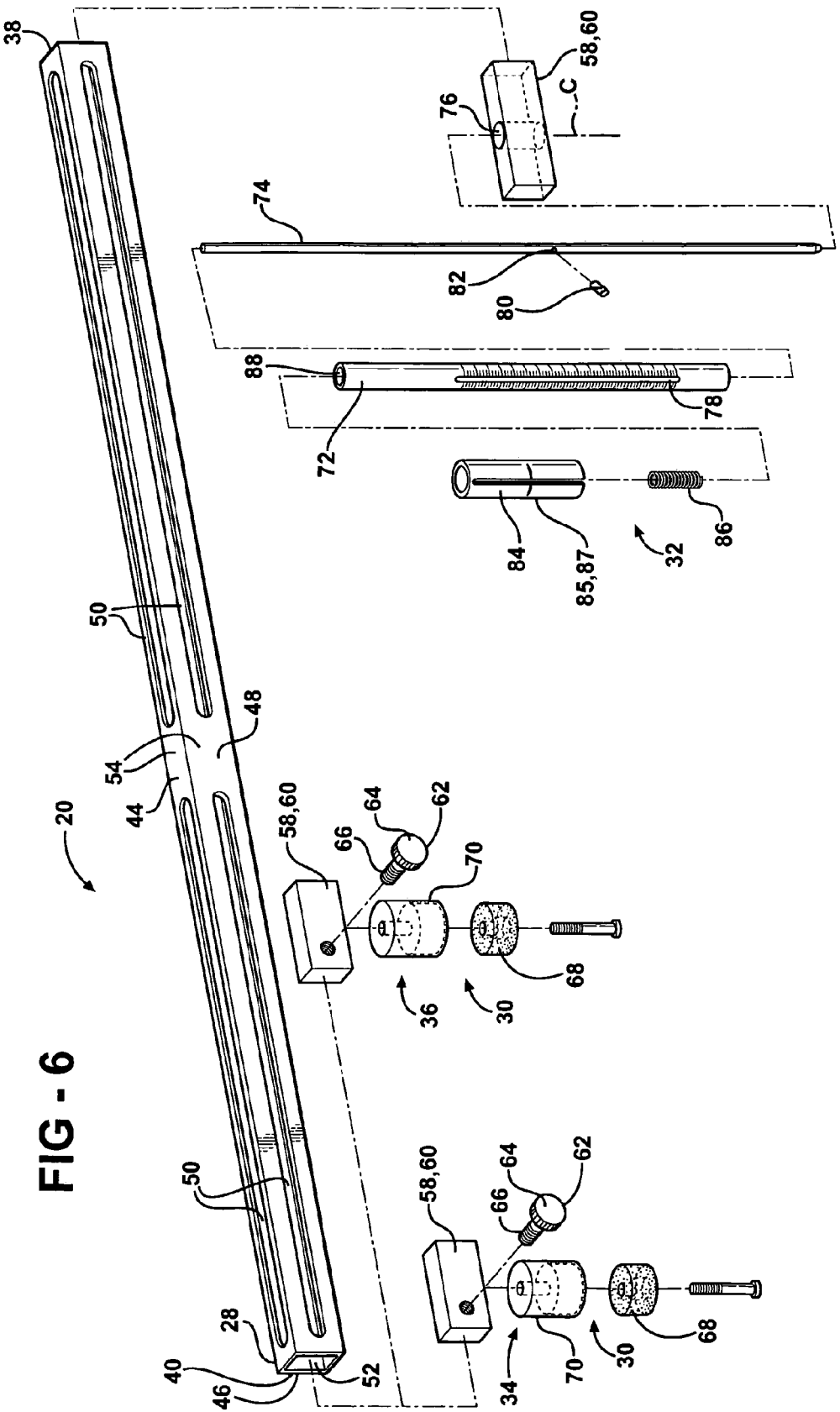
FIG. 6 is an exploded view of the measurement apparatus.
Figure 7:
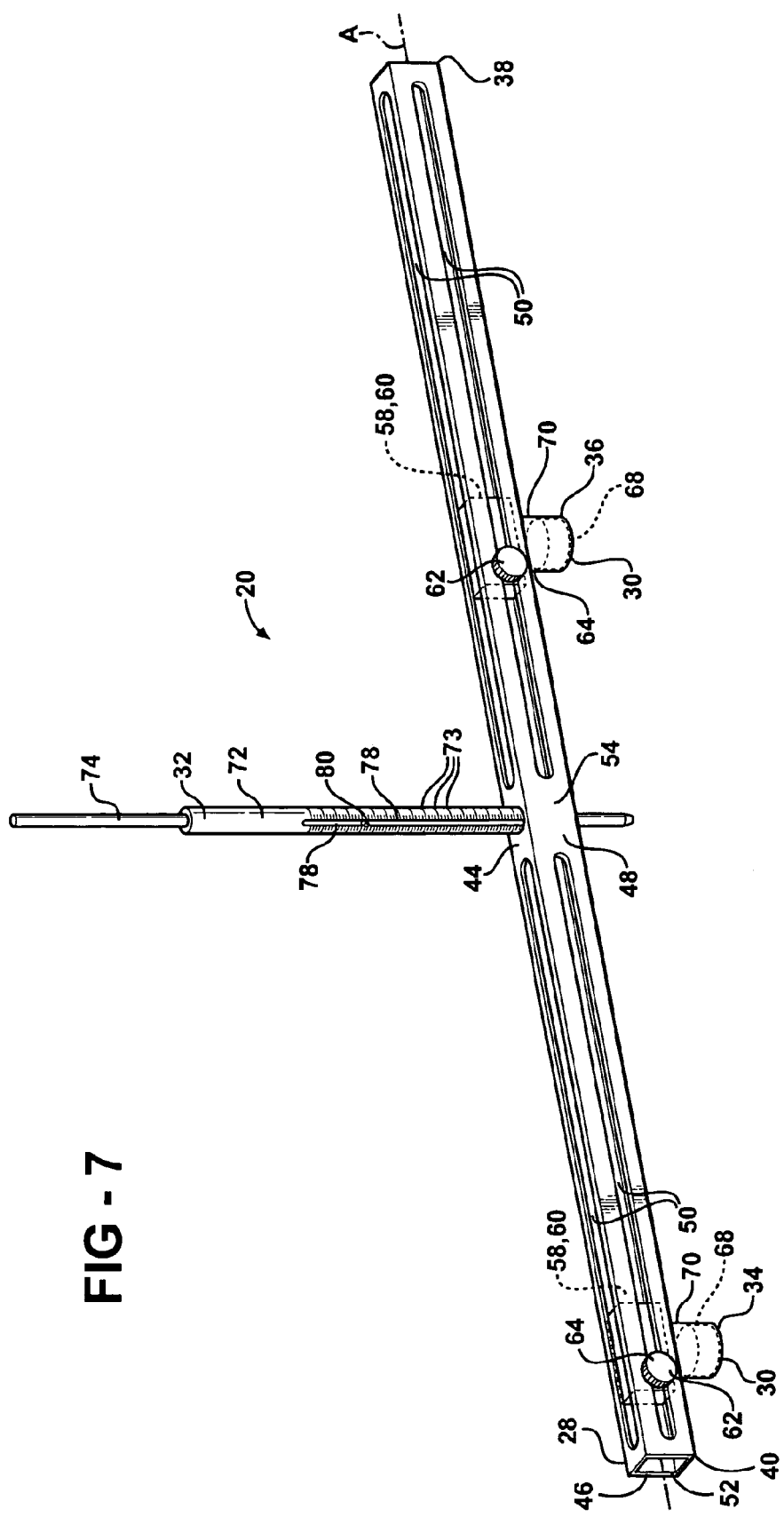
FIG. 7 is a perspective view of another embodiment of the measurement apparatus.

As shown in FIGS. 4-6, in the alternative or in addition to the measuring indicia 73 on the sleeve 72, the measuring device 32 may include a removable member 84 having measuring indicia 85. The removable member 84 is removable from the measuring device 32 and the removable member 84 is interchangeable with another removable member 84 having another measuring indicia.

For example, in one configuration, the measurement apparatus 20 includes a plurality of removable members 84 with each removable member 84 having measuring indicia 85. Each measuring indicia 85, for example, corresponds to a particular measuring condition. For example, in the scenario where the surface 24 is that of a storage drum, the particular measuring conditions include the type of storage drum, the wall thickness of the storage drum, the contents of the storage drum, and customer requirements. In addition, the particular measuring condition may be dependent upon the location of the dent 22 on the shipping container 26. For example, typically a seam of the shipping container 26 is more fragile than the rest of the shipping container 26 and therefore has a different unacceptable dent depth range than that of the rest of the shipping container 26. As another example, typically a storage drum having a thinner wall thickness will dent easier than a storage drum having a thicker wall thickness. As such, all other factors being equal, the unacceptable dent depth range for the removable member 84 used with the thinner wall thickness may start at a shallower depth than that for the thicker wall thickness. A plurality of removable members 84 each having different measuring indicia 85 may be used with the same measurement apparatus 20 such that a single measurement apparatus 20 may be used to measure a surface 24 in any condition. In other words, the removable members 84 are interchanged on the sleeve 72 according to the particular measuring conditions such that the one measurement apparatus 20 is used to measure the depth of the dent 22 regardless of varying measuring conditions. As best shown in FIGS. 4-5, the removable member 84, for example, includes a pass/no pass line 87.

The measuring device 32 includes a resilient member 86 disposed between the sleeve 72 and the rod 74. The resilient member 86 engages the rod 74 to resiliently bias the rod 74 away from the sleeve 72 and toward the surface 24. For example, the indicator 80 extends laterally from the rod 74 and engages the resilient member 86 such that the resilient member 86 exerts force on the indicator 80 to bias the rod 74 away from the sleeve 72. Specifically, the sleeve 72 defines an orifice 88 receiving the rod 74 and the resilient member 86 is a coil spring engaged in the sleeve 72. The rod 74 extends through the coil spring and engages the coil spring such that the coil spring biases the rod 74 outwardly from the sleeve 72.

Figure 8:
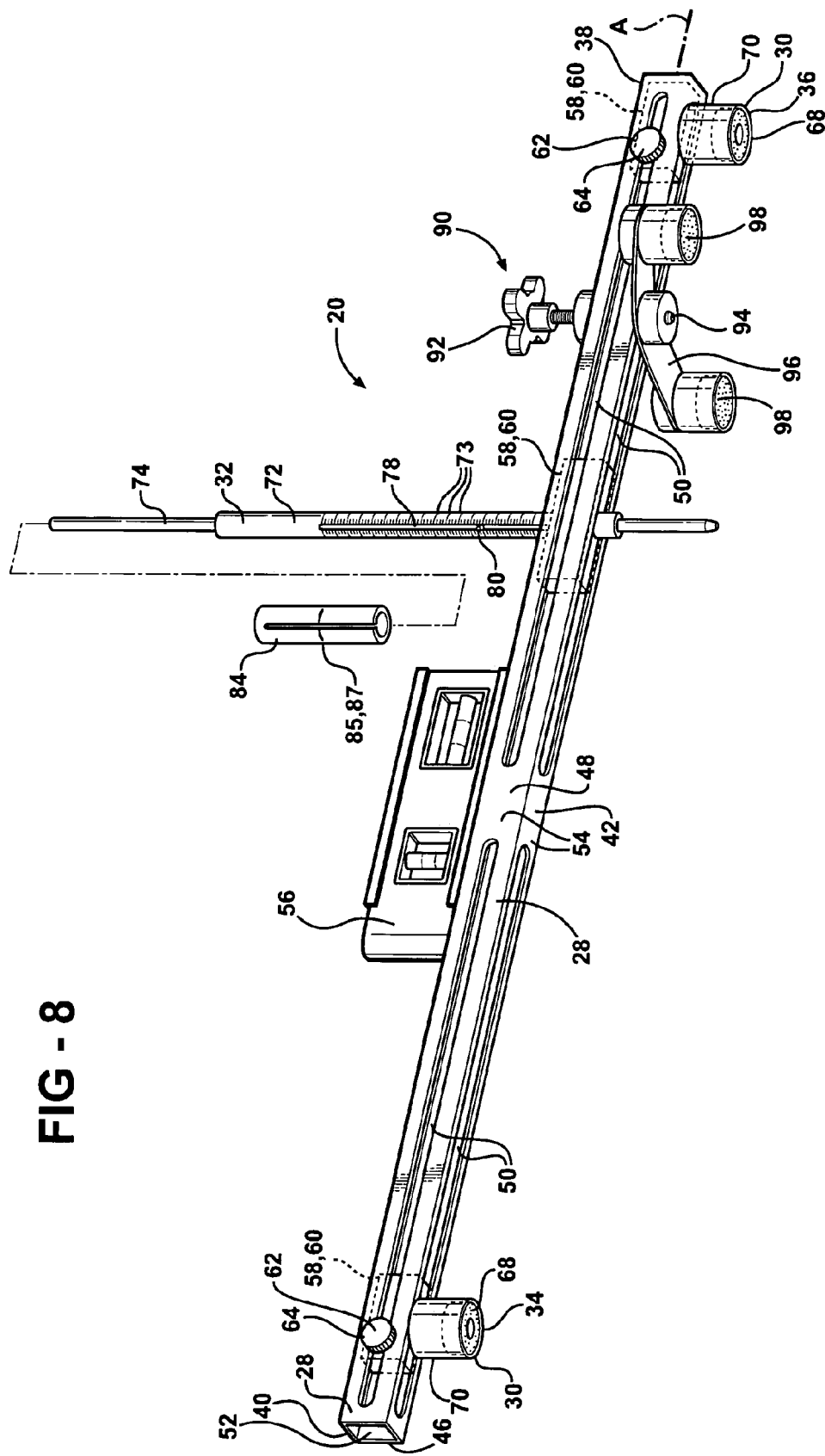
FIG. 8 is a perspective view of another embodiment of the measurement apparatus.

As shown in FIG. 8, the measurement apparatus 20 can include a leveling device 90 coupled to the frame 28 for selectively leveling the measurement apparatus 20 on the shipping container 26. It should be appreciated that the leveling device 90 of FIG. 8 is merely one example of the leveling device 90 used in the methods set forth above and the methods set forth above can be performed with a wide variety of leveling devices without departing from the nature of the present invention.

The leveling device 90 is used to selectively level the measurement apparatus 20 relative to a constant reference, as described further below. Specifically, the frame 28 is typically leveled relative to the constant reference. The constant reference is typically the horizontal plane of the earth as measured by the level gauge 56 described above, i.e., the plane that is perpendicular to the direction of the earth's gravity.

Similar to the mounting devices 30, the leveling device 90 can be selectively moveable along the axis A of the frame 28. For example, the leveling device 90 can include an adjustment device 58 like the one set forth above. The leveling device 90 is typically moved along the axis A of the frame 28 until the level device 90 is at a position along the axis A where the leveling device 90 can be properly used to level the measurement apparatus 20.

The leveling device 90 of FIG. 8 includes an adjustment member 92 such as, for example, a thumbscrew. The adjustment member 92 presents a tip 94 that contacts the shipping container 26. The adjustment member 92 is adjusted, e.g., by rotating the adjustment member 92, such that the tip 94 presses against the shipping container 26 to adjust the position of the frame 28 relative to the shipping container 26 until the frame 28 is level relative to the constant reference. For example, the adjustment member 92 can be adjusted until the level gauge 56 indicates that the measurement apparatus 20 is level.

The leveling device 90 can include a support strap 96 for engaging the shipping container 26 to support the measurement apparatus 20 on the shipping container 26 when the leveling device 90 is adjusted. In other words, when the leveling device 90 is adjusted, the leveling device 90 may disengage one of the mounting devices 30 from the shipping container 26 in which case the support strap 96 supports and stabilizes the measurement apparatus 20 on the shipping container 26. For example, the support strap 96 may include magnets 98 to engage the shipping container 26. In a situation when the leveling device 90 disengages one of the mounting devices 30 from the shipping container 26, the magnets 98 on the support strap 96 remain engaged with the shipping container 26 to support and stabilize the measurement apparatus 20.

The present invention further includes a method of measuring the depth of the dent 22 in the surface 24 with the use of the measurement apparatus 20. The method allows for the quantification of the depth of the dent 22. As set forth above, the method of measuring the depth can be performed with the measurement apparatus 20 set forth herein and it should also be appreciated that the method of measuring the depth can be performed with any type of measurement apparatus without departing from the nature of the present invention.

The method includes positioning the frame 28 with the mounting device 30 mounted to the surface 24. In the configuration where the mounting device 30 includes a magnet 68 and the surface 24 is metal, the magnet 68 is placed in proximity to the surface 24 to magnetically attach the mounting device 30 to the surface 24, as shown in FIG. 3.

The method also includes orienting the frame in a reproducible orientation relative to the surface of the shipping container. The reproducible orientation of the frame relative to the surface of the shipping container enables reproducible measurements. The reproducible orientation can be accomplished in any suitably way, for example by using the level gauge 56. For example, the method includes adjusting the leveling device 90 until the level gauge 56 indicates that the measurement apparatus 20 is level. This adjustment of the leveling device 90 includes adjustment of the leveling device 90 along the axis A of the frame 28 as well as adjustment of the adjustment member 92 as described above. Alternatively, the frame can be, for example, aligned with a reference point to attain the reproducible orientation. The reference point can be, for example, a flat surface on which the drum is placed.

The method further includes aligning the measuring device 32 with the dent of the surface of the shipping container 26 and measuring the depth of the dent on the surface of the shipping container 26. In other words, the method includes reading the measurement from the measuring device 32. For example, the measurement may be read from the measuring device 32 by visual inspection. Alternatively, the measurement may be electronically read, i.e., communicated, from the measuring device 32 with any type of recording medium or other device that records and/or displays data. For example, the recording medium can be a computer. The measurement can be communicated from the measuring device 32 to the recording medium by a wired or wireless connection.

The method optionally includes moving at least one of the mounting device 30 and the measuring device 32 along the frame 28 relative to the other of the mounting device 30 and the measuring device 32. Specifically, the method includes moving at least one of the mounting device 30 and the measuring device 32 along the axis A between the first and second ends 38, 40 of the frame 28.

At least one of the mounting and measuring device 30, 32 is moved along the frame 28 to align the measuring device 32 with the dent 22 in the surface 24. Preferably, the method includes orienting the frame 28 with the rod 74 extending from the sleeve 72 to the surface 24. As such, the mounting device 30 and/or the measuring device 32 are moved along the frame 28 so that the measuring device 32 is aligned with the dent 22. Typically, the depth of the dent 22 is measured at a deepest part of the dent 22 and the measuring device 32 is accordingly aligned with the deepest part of the dent 22. The mounting and measuring devices 30, 32 are also typically moved along the frame 28 such that the mounting device 30 is spaced from any features or dents in the surface 24. For example, the surface 24 includes ribs 89, as shown in FIG. 3. The mounting device 30 and/or the measuring device 32 are moved relative to each other along the frame 28 such that the measuring device 32 is aligned with the dent 22 and such that the mounting device 30 is spaced from the ribs 89. Likewise, for example, the surface 24 may include more than one dent and at least one of the mounting and measuring devices 30, 32 are moved relative to each other along the frame 28 such that the measuring device 32 is aligned with one dent 22 and such that the mounting device 30 is spaced from the other dents. In addition, in the scenario where the surface 24 includes more than one dent 22, the measuring device 32 may be moved along the frame from dent 22 to dent 22 without the need to remount the measurement apparatus 20 to the surface 24.

The step of moving at least one of the mounting device 30 and the measuring device 32 is further defined as adjusting a position of the adjustment device 58 along the axis A of the frame 28. In the configuration where the adjustment device 58 is further defined as the block 60, the step of adjusting the position of the adjustment device 58 is further defined as sliding the block 60 along the slot 50 of the frame 28. Specifically, in the configuration where the adjustment device 58 is further defined as a plurality of blocks 60, the step of adjusting the position is further defined as moving at least one of the plurality of blocks 60 to move at least one of the mounting device 30 and the measuring device 32 relative to each other and the frame 28. In the embodiment shown in FIG. 3 where the mounting device 30 includes the first and second mounting device 34, 36, the step of adjusting the position of the adjustment device 58 is further defined as moving at least one of the first and second mounting devices 34, 36 and the measuring device 32 relative to each other and the frame 28.

The method can also include the step of locking and unlocking the block 60 to the frame 28. Specifically, the method includes moving the block fastener 62 to the engaged position for locking the block 60 to the frame 28 and moving the block fastener 62 to the disengaged position for unlocking the block 60 from the frame 28. Specifically, prior to moving either of the mounting device 30 and the measuring device 32 along the axis A of the frame 28, the block fastener 62 is moved to the disengaged position. The block fastener 62 on each block 60 is moved to the engaged position when the mounting device 30 and the measuring device 32 are located in the desired positions along the axis A of the frame 28.

The step of moving the block fastener 62 to the disengaged position is further defined as threadedly retreating the block fastener 62 away from the block 60 to disengage the head 64 from the frame 28. The step of moving the block fastener 62 to the engaged position is further defined as threadedly advancing the block fastener 62 toward the block 60 to engage the head 64 with the frame 28. As stated above, the block fastener 62, the block 60, and the frame 28 may be arranged in any manner such that the block fastener 62 selectively locks the block 60 in position relative to the frame 28. As such, the method is not limited to the step of engaging the head 64 with the frame 28, but may include any step that moves the block fastener 62 to the engaged and disengaged positions to lock and unlock the block 60 and the frame 28.

When the measuring device 32 is aligned with the dent 22, the method further includes reading a relative position of the indicator 80 relative to the sleeve 72 to quantify the depth of the dent 22. Specifically, the indicator 80 is viewed through the slit 78 and the position of the indicator 80 is compared to the measuring indicia 73 on the sleeve 72.

Alternatively, in the configuration where the measurement apparatus 20 includes the removable member 84, the method includes reading the relative position of the indicator 80 relative to the removable member 84. Further, the method further includes interchanging the removable member 84 with another removable member 84 having another measuring indicia 85. As discussed above, the removable members 84 are interchanged to accommodate particular measuring conditions. As such, the removable members 84 are interchanged on the sleeve 72 according to the different measuring requirements such that the one apparatus is used to measure the depth of the dent 22 regardless of the particular measuring conditions.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of measuring a depth of a dent on a surface of a shipping container wherein the measurement apparatus comprises a frame and has a mounting device and a measuring device each coupled to the frame, the method comprising:

positioning the frame with the mounting device mounted to the surface of the shipping container;

aligning the measuring device with the dent on the surface of the shipping container, and measuring the depth of the dent on the surface of the shipping container.

2. The method as set forth in claim 1 wherein positioning the frame is further defined as orienting the frame in a reproducible orientation relative to the surface of the shipping container.

3. The method as set forth in claim 1 wherein the frame extends along an axis and the mounting and measuring devices are spaced from each other along the axis and wherein aligning the measuring device with the dent is further defined as moving at least one of the mounting device and the measuring device along the axis relative to the other of the mounting device and the measuring device.

4. The method as set forth in claim 3 wherein the measurement apparatus includes an adjustment device coupled to the frame between the frame and at least one of the mounting device and the measuring device and wherein moving at least one of the mounting device and the measuring device is further defined as adjusting a position of the adjustment device along the axis of the frame.

5. The method as set forth in claim 4 wherein the adjustment device includes a block fastener coupled to the block and engagable with the frame and the block and wherein adjusting the position of the adjustment device is further defined as moving the block fastener to an engaged position for locking the block to the frame and moving the block fastener to a disengaged position for unlocking the block from the frame.

6. The method as set forth in claim 1 wherein the measuring device includes a removable member having measuring indicia and further comprising interchanging the removable member with another removable member having another measuring indicia.

7. A measurement apparatus for measuring a depth of a dent on a surface of a shipping container, said measurement apparatus comprising:
    a frame;
    a mounting device coupled to said frame and engagable with the surface of the shipping container for mounting said frame to the shipping container; and
    a measuring device coupled to said frame and adapted to measure the depth of the dent on the surface of the shipping container.

8. The measurement apparatus as set forth in claim 7 wherein said frame extends along an axis and wherein at least one of said mounting device and said measuring device are selectively moveable along said axis relative to the other of said mounting device and said measuring device for aligning said measuring device with the dent on the surface of the shipping container.

9. The measurement apparatus as set forth in claim 7 further comprising an adjustment device coupled to said frame between said frame and at least one of said mounting device and said measuring device.

10. The measurement apparatus as set forth in claim 9 wherein said frame extends along an axis and defines a slot extending along said axis and wherein said adjustment device is further defined as a block slideably engaged with said slot.

11. The measurement apparatus as set forth in claim 10 wherein said adjustment device includes a block fastener coupled to said block with said block fastener engagable with said block and said frame for selectively locking said adjustment device in position relative to said frame.

12. The measurement apparatus as set forth in claim 11 wherein said block fastener includes a head and a threaded shaft extending from said head threadedly engaging said block with said block fastener moveable between an engaged position with said head engaged with said frame for locking said block to said frame and a disengaged position with said head disengaged from said frame for unlocking said block from said frame.

13. The measurement apparatus as set forth in claim 7 wherein said mounting device is further defined as a first mounting device and a second mounting device spaced from each other.

14. The measurement apparatus as set forth in claim 13 further comprising a plurality of blocks slideably engaged with said slot and wherein each of said first and second mounting devices and said measuring device are coupled to at least one of said blocks, respectively.

15. The measurement apparatus as set forth in claim 7 wherein said measuring device includes a sleeve and a rod slideably extending from said sleeve for contacting the surface of the shipping container to measure the depth of the dent.

16. The measurement apparatus as set forth in claim 15 wherein said measuring device includes a resilient member disposed between said sleeve and said rod resiliently biasing said rod away from said sleeve.

17. The measurement apparatus as set forth in claim 7 wherein said measuring device includes a removable member having measuring indicia with said removable member being removable from said measuring device for interchanging said removable member with another removable member having another measuring indicia.

18. The measurement apparatus as set forth in claim 7 wherein said mounting device includes a magnet for magnetically attaching said frame to the surface of the shipping container.

19. The measurement apparatus as set forth in claim 7 further comprising a leveling device coupled to said frame and spaced from said measuring device for selectively leveling said frame relative to a constant reference.

20. A method of preventing formation of dents of an unacceptable classification on a surface of a shipping container, the method comprising;
    calculating an acceptable dent depth range corresponding to the acceptable classification and an unacceptable dent depth range corresponding to the unacceptable classification;
    classifying a plurality of dents on the surface of the shipping container as being in the unacceptable dent depth range with a measurement apparatus;
    determining the cause of the dents classified in the unacceptable classification; and
    identifying at least one remedy that eliminates the cause of the dents classified in the unacceptable classification; and
    implementing the at least one remedy to prevent the formation of the dents classified in the unacceptable classification.

21. The method as set forth in claim 20 wherein determining the cause of the dent is further defined as identifying sources of dents, forming the plurality of dents with each source, and measuring a depth of the plurality of dents.

22. The method as set forth in claim 20 further comprising correlating the depth with each source of dents to determine a dent depth range for each source of dents.

23. The method as set forth in claim 20 further comprising measuring the depth of the dent of another shipping container and comparing the depth of the dent of the another shipping container to the dent depth range for each source to determine the source of the dent.

24. The method as set forth in claim 20 wherein implementing the remedy is further defined as protecting the shipping container with precautionary measures sufficient to prevent the formation of dents of the unacceptable classification.

25. The method as set forth in claim 24 wherein protecting the shipping container with precautionary measures is further defined as providing the surface of the shipping container with impact absorbing material.

26. The method as set forth in claim 24 wherein implementing the remedy is further defined as examining a plurality of shipping containers to determine an area of the plurality of shipping containers that most frequently exhibit dents of the unacceptable classification and protecting the area with precautionary measures.

27. The method as set forth in claim 20 wherein implementing the remedy is further defined as measuring a depth of the plurality of dents of the unacceptable classification to determine the depth that is most frequently exhibited and determining the force required to form dents having the depth that is most frequently exhibited.

* * * * *